Dec. 17, 1935.  E. S. PEARCE  2,024,536
JOURNAL BEARING LUBRICATION
Filed Dec. 1, 1933  3 Sheets-Sheet 1

Fig:1

INVENTOR
Edwin S. Pearce
BY
Synnestvedt & Lechner
ATTORNEYS

Dec. 17, 1935.   E. S. PEARCE   2,024,536
JOURNAL BEARING LUBRICATION
Filed Dec. 1, 1933   3 Sheets-Sheet 2

INVENTOR
Edwin S. Pearce
BY
Synnestvedt & Lechner
ATTORNEYS

Dec. 17, 1935.    E. S. PEARCE    2,024,536
JOURNAL BEARING LUBRICATION
Filed Dec. 1, 1933    3 Sheets-Sheet 3

INVENTOR
Edwin S. Pearce
BY
Synnestvedt & Lechner
ATTORNEYS

Patented Dec. 17, 1935

2,024,536

UNITED STATES PATENT OFFICE 2,024,536

JOURNAL BEARING LUBRICATION

Edwin S. Pearce, Indianapolis, Ind.

Application December 1, 1933, Serial No. 700,437

6 Claims. (Cl. 308—79)

This invention relates to lubrication of bearings and is particularly useful in connection with railway vehicle axle box journal bearings of the type disclosed in my copending application Serial No. 533,014, Patent No. 1,964,688, filed April 27th, 1931, and will be described as applied to a journal box equipped with a bearing of that type although it is useful also in connection with other types of bearings.

One of the primary objects of my invention is to prevent overheating of bearings by supplying additional or fresh lubricant under control of bearing temperature.

A further object of my invention is the provision of temperature sensitive means for controlling the addition of lubricant to bearings of the type in which oil is circulated from one side to the other side of the crest of the bearing as is done, for example, in my application above referred to.

A more specific object resides in the provision of a reservoir from which flow of lubricant is controlled by valve means thermostatically actuated to open position when the bearing temperature reaches a predetermined value.

Still another object is the provision of a device operating to automatically add lubricant which is arranged to apprise an attendant if a tendency toward overheating of the bearing existed during a period of operation.

How the foregoing, together with such other objects and advantages as may hereinafter appear or are incident to my invention are realized, is illustrated in preferred form in the accompanying drawings, wherein.

Figure 1:
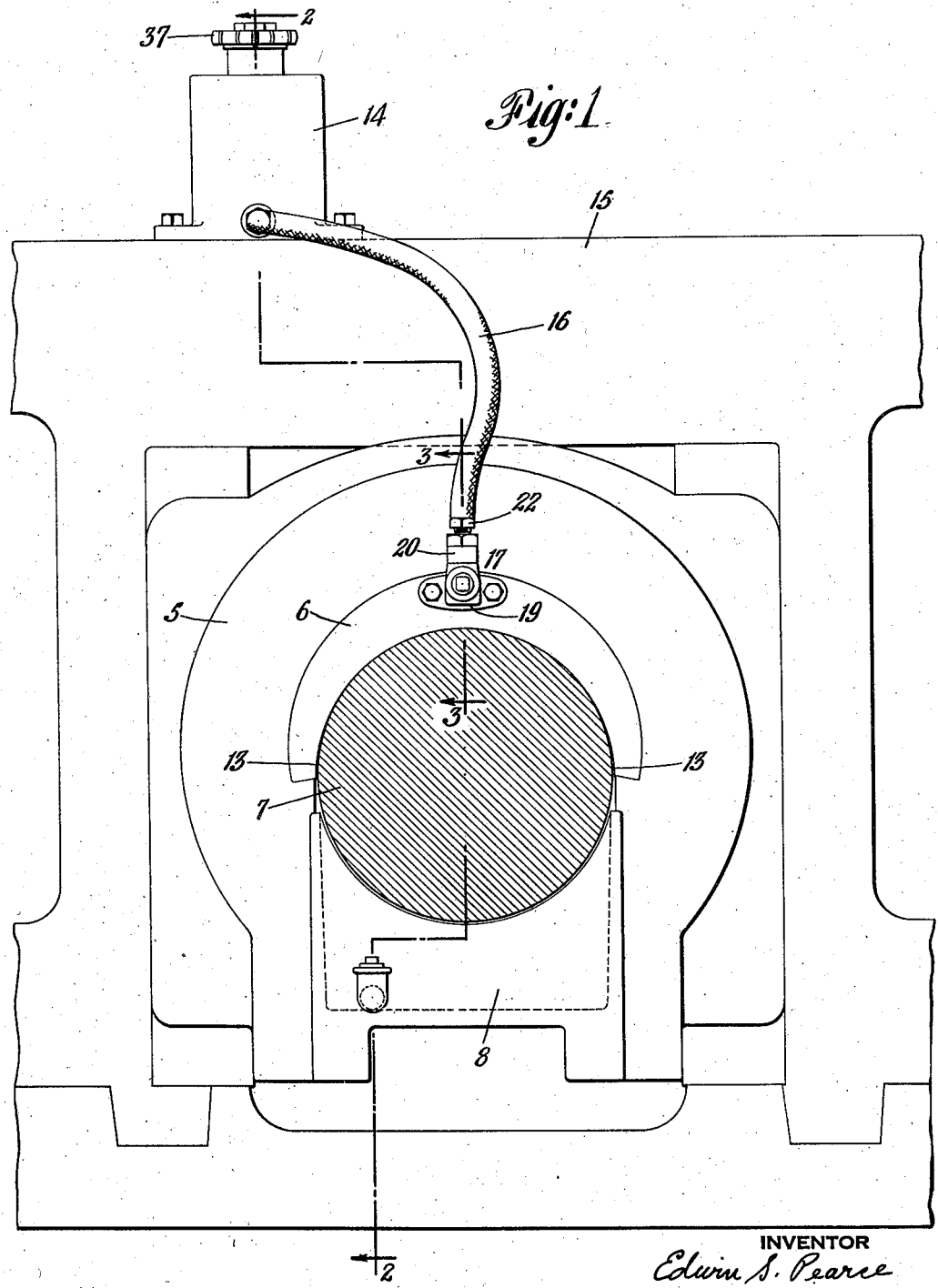
Figure 1 is an elevational view illustrating a locomotive driving box embodying my invention with the axle shown in section.
Figure 2:
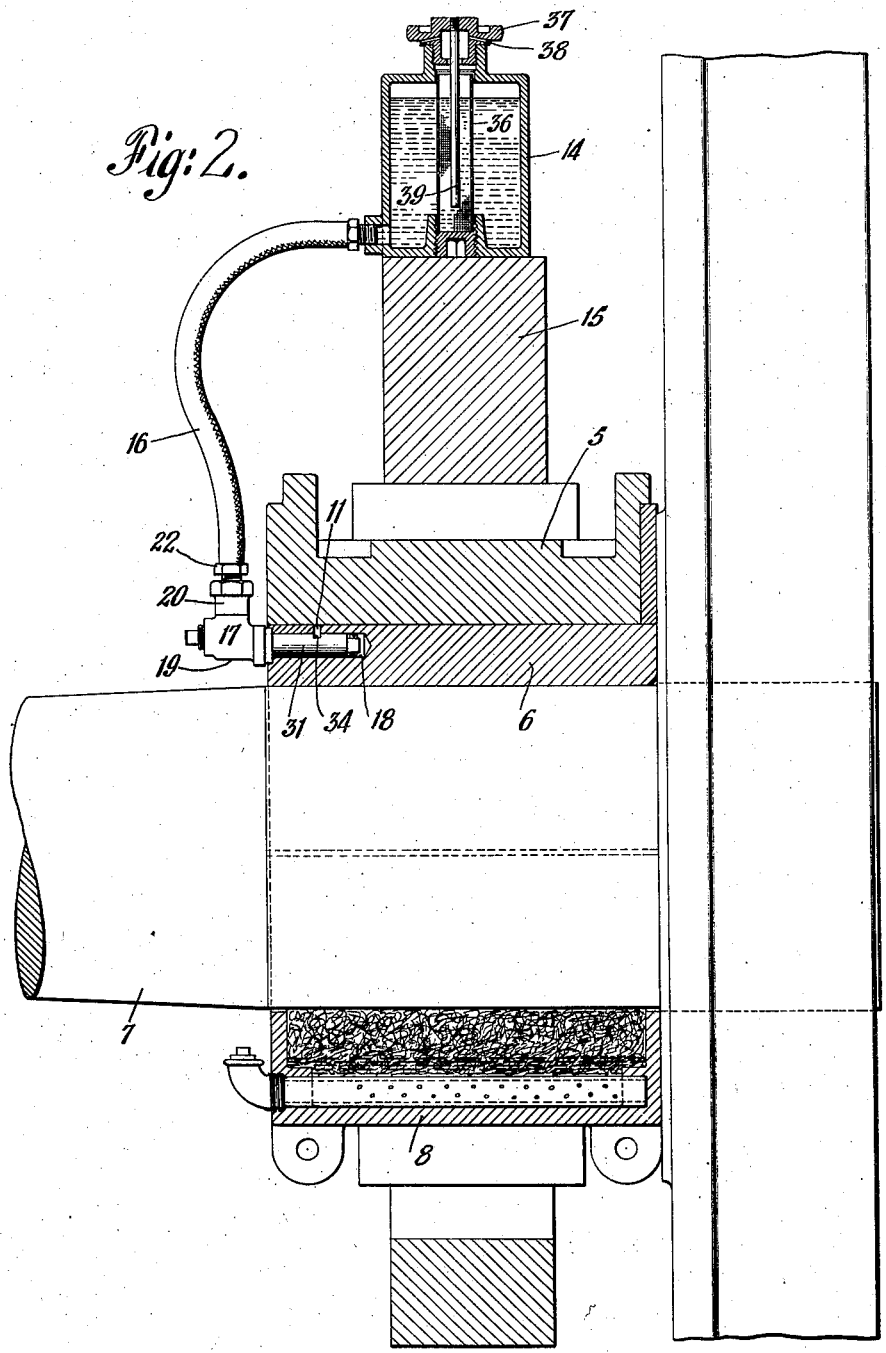
Figure 2 is a cross section taken substantially on the line 2—2 of Figure 1.
Figure 3:
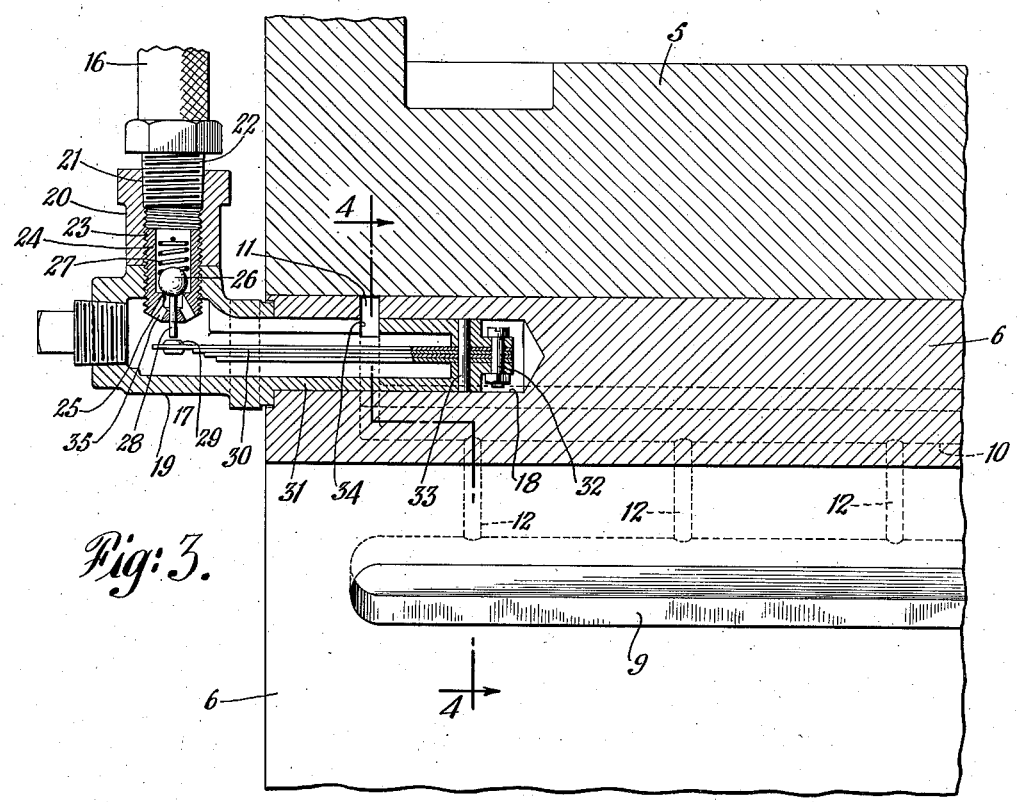
Figure 3 is an enlarged fragmentary cross section taken on the line 3—3 of Figure 1 with the axle removed.

In the drawings I have illustrated my invention as applied to a locomotive driving box which comprises in general a journal box 5, a crown bearing or brass 6 for the journal or axle 7 and a cellar 8 in the form of a box having an open top containing waste and oil. A perforated pipe may be provided in the cellar for drawing off surplus oil accumulating in the bottom thereof.

Figure 4:
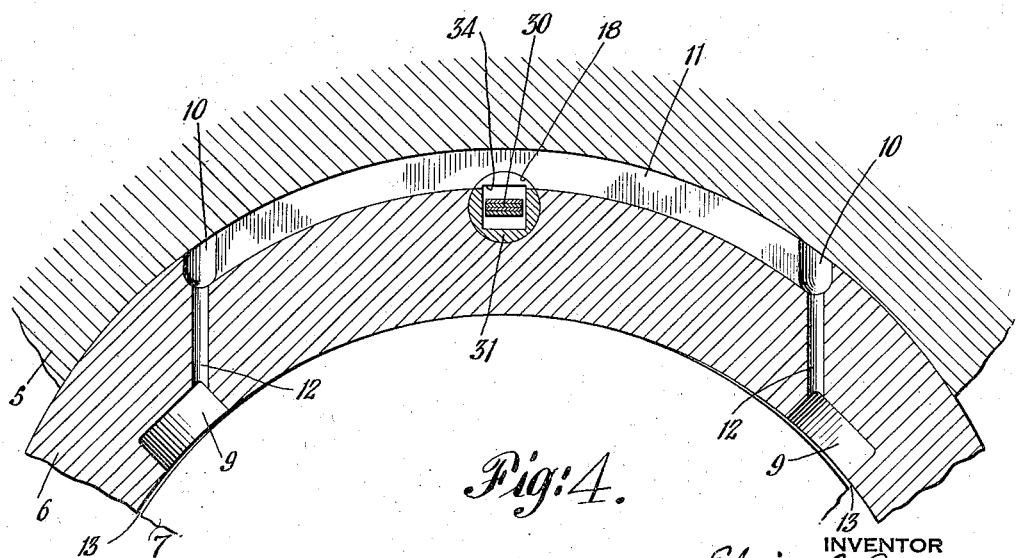
Figure 4 is a fragmentary sectional view taken on the line 4—4 of Figure 3 with a portion of the axle diagrammatically indicated.

The crown bearing 6 is constructed in accordance with the disclosure in my copending application above referred to in that it is provided with an axially extending oil slot or groove 9 in its journal face at each side of the crest, which grooves are located preferably at the sides of the effective arc of bearing contact as shown. The bearing is also provided with longitudinal channels 10, in this instance formed by grooves in the back of the bearing which become closed ducts when the bearing is press fitted into the box 5. A similarly formed cross duct or channel 11 connects the longitudinal channels 10, and a plurality of ducts or channels 12 establishes communication between the grooves 9 and the channels 10. The grooves 9 are so located that they will be in free communication with the wedge spaces 13 between the journal and the bearing as illustrated in Figure 4, and therefore when the journal 7 is turning counterclockwise oil will be carried up by the journal under the inbound side of the bearing 6 and forced into the right-hand groove 9. When sufficient oil has collected in this groove to seal it against access of air it flows into the corresponding duct 10 through the medium of the ducts 12, then into the other longitudinal duct 10 through the medium of the cross duct 11, then into the other or left-hand groove 9 through the medium of the other ducts 12 and finally out between the bearing and the journal at the groove 9 and wedge space 13 on the opposite side of the crest from which it entered. This circulation is caused primarily by the vacuum or suction created at the outbound side which vacuum draws the lubricant up from the groove 9 on the inbound side.

Obviously, when rotation of the journal is reversed the circulation is reversed but this does not impair the lubrication even temporarily because of the even distribution of the oil in the waste afforded through the arrangement, and the fact that the passages act as a storage reservoir so that oil begins to flow from them just as soon as the journal begins to rotate.

The relative sizes of the ducts, grooves, or channels referred to are calculated so as to best meet the requirements of a particular service and by way of specific example I have found that in all standard sizes of car journal brasses it is preferable to make the cross sectional area of the duct 11 equal to that of an orifice of $\frac{3}{16}$-inch diameter, that of the longitudinal ducts 10 equal to an orifice of $\frac{13}{32}$-inch diameter, and to employ four $\frac{1}{8}$-inch diameter holes 12 equally spaced longitudinally of the bearings. The width of the slots 9 may vary from ¾ inch to 1 inch.

A reservoir 14 containing an auxiliary supply of oil is mounted at a location convenient to the driving box, such for example as on the frame 15. Oil is led from this reservoir and delivered to the journal box preferably through the bearing by means of a temperature controlled conduit adapted to establish communication between the reservoir and the bearing passages above referred to. In the particular arrangement illustrated in the drawings this comprises a flexible tube 16 connected at one end into the lower portion of the reservoir and at its other end into a thermostatic unit 17 secured as by means of bolts to the bearing 6 to fit a cavity 18 which communicates with the cross duct 11 in the bearing.

The thermostatic unit 17 comprises a body member or casing 19 having an upright portion 20 internally threaded at 21 for the tube connection 22, and internally threaded at 23 for the reception of a member 24 having a valve seat 25 for a valve 26. The valve 26 is pressed to its seat by means of a spring 27 and has a downwardly extending pin 28 adapted for contact with a pad 29 carried by the temperature sensitive element 30 which may be of any well known type. In this instance I have illustrated a duplex or bimetal element secured at one end in the horizontally extending portion 31 of the body 19 by means of a bolt 32 and centering pin 33 and having its other or free end positioned beneath the valve pin 28.

The portion of the body 19 which is located in the cavity 18 is provided with a port 34 which registers with the duct 11 so that when the valve 26 is open oil will flow from the reservoir 14 to the duct 11 thru the medium of the tube 16, the hollow interior of the body 19, and port 34.

In connection with the operation of the device it is pointed out that bearing temperatures with oil lubrication are normally around 75 to 100 degrees Fahr. and that a "hot box" or "hot bearing" with oil is not a potential possibility until approximately 300 degrees Fahr. is reached.

However, there are times when the temperature becomes abnormal due to causes such as the oil supply in the waste being low, flow thru the waste being impeded because of dirt, or improper contact between the waste and the journal surface. The usual remedy is an augmented oil supply but since there is no way in constructions heretofore employed of augmenting the oil supply automatically when abnormal temperatures are reached, the first usual sign of a deficiency in lubrication is a so-called hot box or hot journal, at which time remedy from a strictly lubricating standpoint cannot be accomplished because the damage already done must be corrected by mechanical work such as turning the journals and/or renewing the crown brasses, which is a very expensive remedy.

During a period of operation a journal may reach abnormal temperatures and cool down several times before the temperature reaches the point which would cause a hot or scored journal, without being detected until serious difficulty arises and I have found by tests that such trouble can be avoided by adding oil as soon as a predetermined temperature below the damage point is reached.

I have therefore provided the thermostatically controlled device described which operates to automatically feed additional oil to the box thru the bearing at temperatures below the damage point and while the temperatures at which the oil should be added will vary in different bearings, I have found that in bearings of the type herein disclosed the device should feed oil when the temperature is from 165 degrees Fahr. to 200 degrees Fahr. and above. The setting of the temperature sensitive element 30 of the device is regulated by means of the member 24 which controls the relation of the valve pin 28 to the thermal element 30 and assuming now that the setting is such as to cause operation within the temperature range above mentioned the device will function as follows:

When the journal is rotating, oil is circulated thru the bearing duct 11 at approximately bearing temperature and the horizontal portion 31 of the body 19 is filled with oil which heats the thermostatic unit. The unit also receives heat from the bearing because of its direct metallic contact therewith. The portion of the body above the valve 26 is filled with reservoir oil which is at a lower temperature.

On increase in bearing temperature the heat sensitive element 30 bends upward due to its particular construction and when the temperaperature has increased to the point at which the clearance between the valve pin 28 and pad 29 is taken up the valve 26 is raised from its seat, thus allowing oil to pass through holes 35 into the portion 31 of the body and from thence into the duct 11 to enter into circulation with the oil therein. As the temperature increases the valve opens wider, and as it decreases the valve moves toward closed position until the low temperature point is reached when it entirely closes.

Since the oil entering from the reservoir is cooler than that in the bearing the element 30, with which the oil directly contacts, is cooled thereby and when sufficient oil has entered the element will move downwardly to close the valve. Should the temperature continue to rise toward 200 degrees the valve will open and close at say approximately 5 degree intervals in temperature until finally it remains open to provide a steady flow of oil to the box thru the bearing and of course when a supply of oil has been provided sufficient to permanently reduce the bearing temperature, the oil supply is shut off.

It will thus be seen that the device supplies oil to the box when, as, and if needed and in the proper amount to reduce friction and bearing temperature and prevent hot boxes or bearings. While I have mentioned a specific temperature range this is only by way of example and may be varied by adjusting the device to a different setting.

The oil reservoir 14, in addition to being the source of oil supply, serves as an indicator for apprising an attendant or inspector of any trouble developing in the bearing because if, on inspection, it is found that the reservoir is still full of oil it is evidence that at no time since the last inspection did the bearing reach the temperature at which the device is set, i. e., a temperature above normal. On the other hand, if it be found that oil was withdrawn, it is evidence that the bearing is a source of potential trouble and the amount of oil withdrawn will be an indication of the seriousness of the trouble. Under the first mentioned condition there is no need for inspecting the bearing while under the second condition careful inspection should be made.

It will be noted that although in the latter case some objectionable condition existed in the bearing, this did not cause a failure because additional lubricant was supplied to the bearing at the time needed. By inspecting the bearing, waste, and oil in the cellar for the cause of the difficulty and then correcting it, future trouble is avoided.

The reservoir 14 is provided with a strainer 36 to keep dirt from getting into the main body of oil and a convenient filling cap 37 is employed. The cap has a small air vent 38 to permit flow of oil from the reservoir and is provided with a rod 39 for conveniently gauging the depth of the oil in the reservoir. The presence of the vent 38 does not break the vacuum condition in the bearing passages because even when the thermostatic unit is feeding oil there is a volume of oil between the bearing passages and the atmosphere.

It will be seen, therefore, that I have provided a temperature controlled means for adding lubricant to that which is in circulation in the box and that this means delivers to passages which convey the lubricant from one side of the journal to the other thru the bearing. The passages which connect the grooves 9 need not be entirely in the bearing although the arrangement illustrated is preferred and conforms to the showing of my earlier application above referred to. The temperature of the bearing and of the circulating lubricant controls the time when and the quantity of the oil which is added.

It is important that the lubricant be delivered at some point in the circuit of the circulation so that the waste is kept thoroughly saturated throughout its mass; i. e., on the outbound side as well as on the inbound side of the journal so that, upon reversal of journal rotation, lubricant will be immediately delivered by the journal to the bearing. In this connection it should be explained that after a long period of operation in one direction the lubricant tends to accumulate in the waste at the inbound side of the journal leaving the waste at the outbound side in a comparatively dry condition. Then when reversal of journal rotation takes place, a hot box is liable to occur before the lubricant can be carried back thru the waste to the side which has now become the inbound side of the journal.

In conclusion, I should like to point out that my invention differs quite radically from those prior constructions in which attempts have been made to deliver lubricant directly to the contacting surfaces between the bearing and the journal. This cannot be successfully accomplished because of the enormous pressures involved which prevent the lubricant from entering. By my invention, on the contrary, I deliver the lubricant into the circulating stream and I may do so at any point which is convenient or desirable although, as stated I prefer the arrangement illustrated.

I claim:—

1. In combination, a bearing for a rotating member, an oil slot in the bearing surface at each side of the effective arc of contact of the rotating member and bearing, otherwise closed passage means connecting said slots to provide for the by-passing of lubricating oil from one side of said arc of contact to the other side thereof in accordance with the direction of rotation of the rotating member, means for preventing overheating of the bearing including an oil reservoir, a conduit connecting said reservoir with said passage means, valve means controlling said conduit and thermostatic means responsive to the temperature of the oil being by-passed and operating on the valve means to open and close it within a predetermined temperature range of the oil.

2. The combination with a journal bearing having an axially extending groove in its journal face at each side of the crest, and passage means connecting said grooves, said passage means being closed except for its connection to said grooves, of means for delivering lubricant to the surface of the journal at a point to the outside of said grooves, means for introducing additional lubricant including a source of lubricant supply connected to lead lubricant to said passage means, and means responsive to the temperature of the bearing for controlling the introduction of the additional lubricant.

3. In a railway vehicle, the combination of a journal box, a crown bearing, a longitudinal oil channel in the bearing surface at each side of the crest, an oil circulating passage means constructed and arranged as a closed cross connection between said longitudinal channels, means in the box for delivering lubricant to the surface of the journal at a point to the outside of said longitudinal channels, a lubricant reservoir connected to deliver into said circulating passage means, a valve normally closing said delivery connection, and a thermostat subject to the temperature of the oil circulating in said passage means, which thermostat is arranged to open said valve when the temperature rises above a predetermined point.

4. In a railway vehicle, the combination of a journal box, a crown bearing providing a wedge space at each side of the crest, a longitudinal oil channel in the bearing surface at each side of the crest communicating with the corresponding wedge space, an oil circulating passage means constructed and arranged as a closed cross connection between said longitudinal channels, means in the box for delivering lubricant to the surface of the journal at a point to the outside of said longitudinal channels, a lubricant reservoir connected to deliver into said circulating passage means, a valve normally closing said delivery connection, and a thermostat subject to the temperature of the oil circulating in said passage means, which thermostat is arranged to open said valve when the temperature rises above a predetermined point.

5. In a railway vehicle, the combination with the journal on an axle, of a journal box containing lubricant and waste, a crown bearing, a longitudinal oil channel in the bearing surface at each side of the crest, an oil circulating passage means constructed and arranged as a closed cross connection between said longitudinal channels, a lubricant reservoir connected to deliver into said circulating passage means, a valve normally closing said delivery connection, and a thermostat subject to the temperature of the oil circulating in said passage means, which thermostat is arranged to open said valve when the temperature rises above a predetermined point.

6. In a railway vehicle, the combination with the journal on an axle, of a journal box containing lubricant and waste, a crown bearing providing a wedge space at each side of the crest, a longitudinal oil channel in the bearing surface at each side of the crest communicating with the corresponding wedge space, an oil circulating passage means constructed and arranged as a closed cross connection between said longitudinal channels, a lubricant reservoir connected to deliver into said circulating passage means, a valve normally closing said delivery connection, and a thermostat subject to the temperature of the oil circulating in said passage means, which thermostat is arranged to open said valve when the temperature rises above a predetermined point.

EDWIN S. PEARCE.